United States Patent [19]
Gartland, Jr.

[11] 3,784,961
[45] Jan. 8, 1974

[54] CABLE CLAMP

[75] Inventor: Albert J. Gartland, Jr., Trumbull, Conn.

[73] Assignee: Harvey Hubbel Incorporated, Bridgeport, Conn.

[22] Filed: Apr. 24, 1972

[21] Appl. No.: 246,933

[52] U.S. Cl. ............................... 339/107, 174/156
[51] Int. Cl. ........................................... H01r 13/58
[58] Field of Search ................. 174/135, 155, 156, 174/157; 339/103, 105, 107, 141, 208, 210; 24/123 R, 123 E, 122.3, 122.6

[56] References Cited
UNITED STATES PATENTS

| 907,251 | 12/1908 | Lawrence | 174/157 |
|---|---|---|---|
| 3,571,781 | 3/1971 | Gartland et al. | 339/105 |
| 3,605,059 | 9/1971 | Lipinski et al. | 339/105 X |
| 2,276,557 | 3/1942 | Woodhead | 339/103 C X |
| 2,091,054 | 8/1937 | Petrie | 339/103 C X |

FOREIGN PATENTS OR APPLICATIONS

| 1,190,333 | 5/1970 | Great Britain | 339/186 M |
|---|---|---|---|
| 1,110,715 | 7/1961 | Germany | 339/265 |
| 622,051 | 4/1949 | Great Britain | 339/107 |

Primary Examiner—Marvin A. Champion
Assistant Examiner—Lawrence J. Staab
Attorney—Armand Cifelli et al.

[57] ABSTRACT

An apparatus for clamping electrical cables, particularly where cables of widely varying diameter are clamped. Cables of relatively greater diameter are accommodated by utilizing clamping jaws with criss-cross gripping ribs to reduce elliptical distortion through a multi-mode distribution of the clamping forces. Cables of relatively lesser diameter are accommodated by extending the gripping ribs to overlap the interface between the clamping jaws and enfold the cable within a conduit. The overlapping and criss-crossed ribs also provide for a more even distribution of the clamping forces to prevent cable ruptures.

9 Claims, 9 Drawing Figures

PATENTED JAN 8 1974 3,784,961

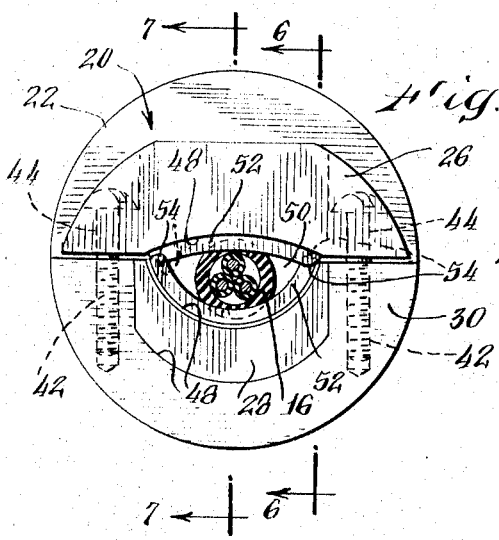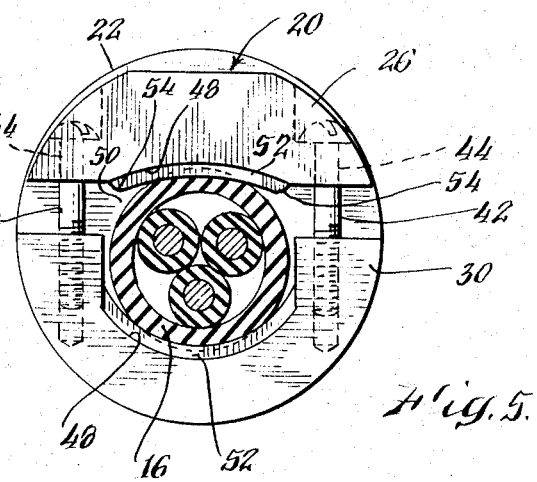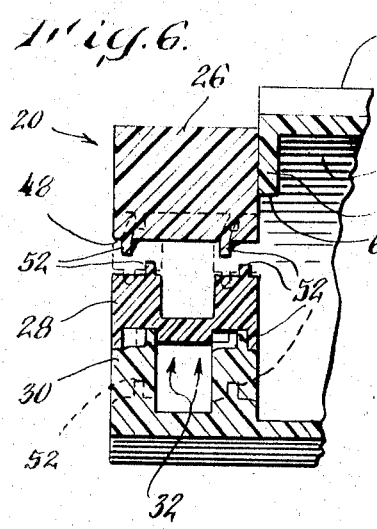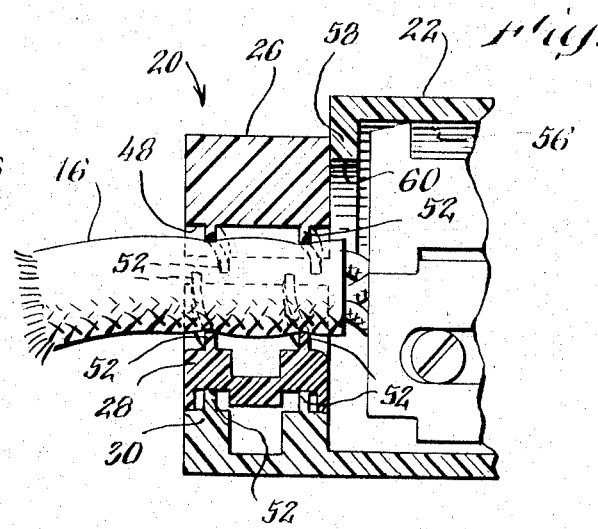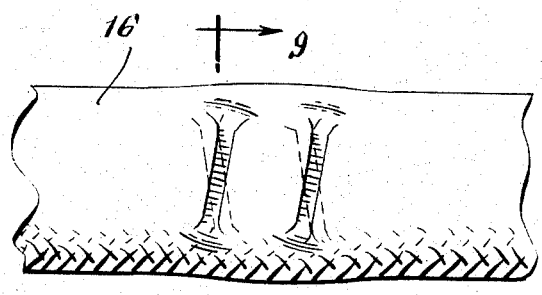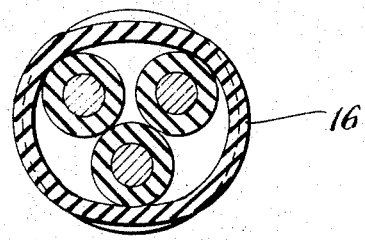

CABLE CLAMP

BACKGROUND OF THE INVENTION

The present invention relates to cable clamping apparatus, and particularly, to such apparatus for applying evenly distributed, multi-mode clamping forces to cables of widely varying diameters. Specifically, this invention relates to improvements in the clamping apparatus disclosed in the Gartland et al U.S. Pat. No. 3,571,781 and assigned to the present applicant. The disclosure of the Gartland et al patent is hereby incorporated by reference.

In the Gartland et al patent, a connector clamp for a range of cable diameters is disclosed which applies persisting clamping forces to the cable as permanent set reduces the resiliency of the cable over a period of time. Dual clamping members are disposed to converge upon the cable in a jaw-like action and each member has gripping ribs to localize the clamping forces applied to the cable. Pairs of opposing gripping ribs are disposed across the cable and apply purely compressive forces to the cable. While the Gartland et al connector clamp apparatus has proven successful in overcoming the disadvantages of previously known connector clamps, the compressive forces applied thereby cause an elliptical distortion across the cable, which can result in accumulation of the cable jacket between the clamping members. Depending on the size of the cable, the material of the cable jacket and the size of the clamping members, this accumulation of the cable jacket may limit the range of cable diameters clamped or may cause an uneven distribution of clamping forces to rupture the cable jacket. The present invention is directed to reducing the elliptical distortion to a minimum by applying the clamping forces to the cable in both torsion and compression.

SUMMARY OF THE INVENTION

It is therefore a general object of the present invention to provide a cable clamping apparatus which minimizes and obviates the disadvantages of the prior art.

It is a specific object of the present invention to provide a cable clamping apparatus which applies multimode clamping forces to cables in a wide range of diameters without causing deleterious effects to the cables.

It is a more specific object of the present invention to provide a cable clamping apparatus which includes strain relieving members to apply persisting multimode clamping forces when permanent set occurs to the cable.

These objects are accomplished in one form according to the present invention by disposing a pair of clamping members about the cable and interconnecting these members to converge upon and clamp the cable. EAch clamping member is configured to have an arcuate portion complementary in shape to the cable and gripping ribs are disposed across each arcuate position to localize the clamping forces applied to the cable. Disposition of the gripping ribs on each clamping member is crisscross relative to the gripping ribs on the other clamping member and therefore both torsional and compressive forces are applied to the cable as the clamping members are converged. Each gripping rib is of a greater arc segment than the adjoining arcuate portion and protrudes from its clamping member at two locations. When fully converged, the clamping members abut with the protruding portions of the gripping ribs overlapping the interface between the clamping members.

BRIEF DESCRIPTION OF THE DRAWINGS

The manner in which these and other objects of the invention are achieved will best be understood by reference to the following description, the appended claims, and the attached drawings wherein:

FIG. 4 is an enlarged end elevational view thereof illustrating the overlap possible between the gripping ribs of the upper and lower jaws to enfold the cable within a conduit;

FIG. 5 is a similar view to FIG. 4 but with the insert removed to illustrate the use of the cable clamp with a large diameter cable;

FIG. 6 is a partial section thereof without the cable and contact holder, taken substantially along line 6—6 of FIG. 4 to illustrate the crisscross nature of the gripping ribs on the upper and lower jaws;

FIG. 7 is a partial section thereof taken substantially along line 7—7 of FIG. 4 to illustrate the use of the gripping ribs to localize the clamping forces;

FIG. 8 is a plan view of a cable illustrating the imprints of the gripping ribs thereon; and FIG. 9 is a sectional view thereof taken substantially along line 9—9 of FIG. 8 to illustrate the cross sectional distortion caused to the cable by one pair of converging gripping ribs.

DESCRIPTION OF THE PREFERRED EMBODIMENT

Figure 1:
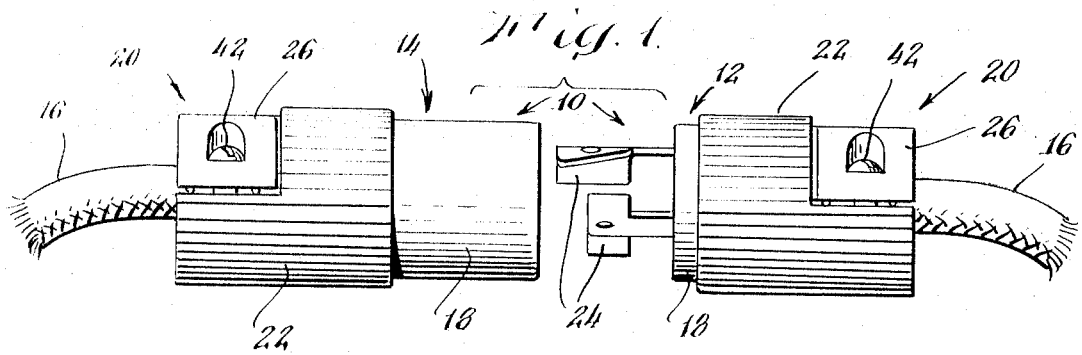
FIG. 1 is a side elevational view of a cable connector having the cable clamping apparatus of this invention incorporated in both the cap and connector body thereof.

Turning now to the drawings and more particularly to FIG. 1, there is illustrated a cable connector 10 having a cap 12 and a connector body 14, each of which incorporates the cable clamping apparatus of this invention. An electrical cable 16 is connected separately to each of the cap 12 and the connector body 14. In each of the cap 12 and connector body 14, a contact holder 18 and a cable clamp 20 are separately secured to a housing 22 by suitable fastening means, such as is discussed later in this specification. On the cap 12, the contact holder 18 includes blades 24 which engage into slots (not shown) in the contact holder 18 of the connector body 14 to electrically interconnect the cable 16. The contact holder 18 includes terminal means for electrically connecting either the blades 24 or the slots to the conductors within the cable 16.

Figure 2:
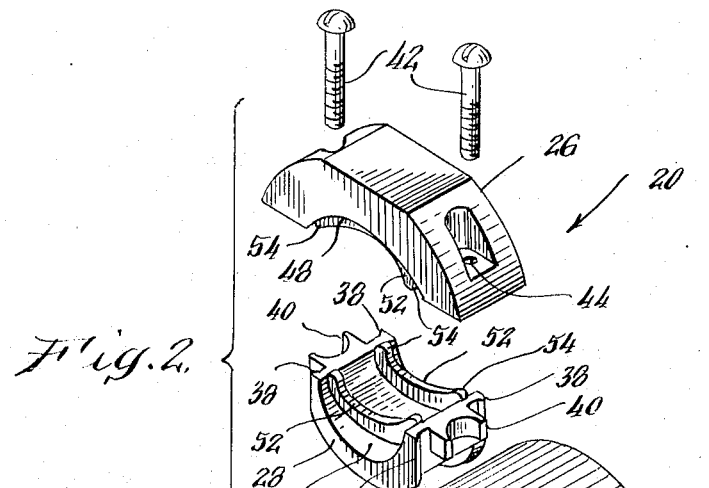
FIG. 2 is an enlarged and exploded partial view thereof without the cable, illustrating the insert utilized in the lower clamping jaw to accommodate a wider range of cable diameters.
Figure 3:
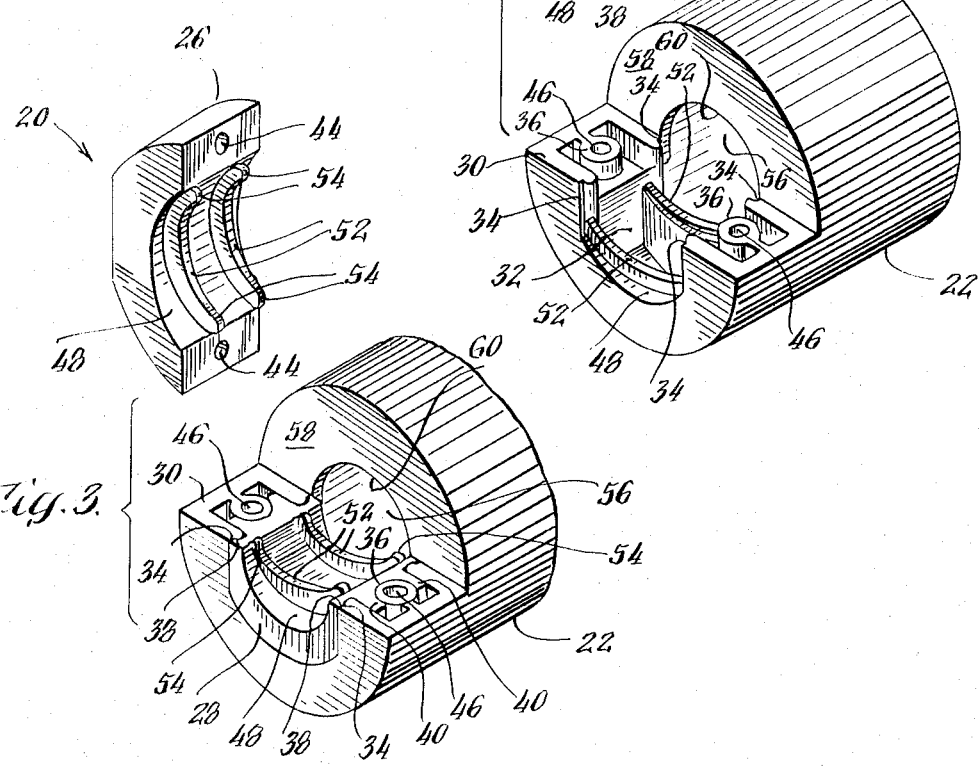
FIG. 3 is a similar view to FIG. 2, illustrating the crisscross disposition of the gripping ribs on the upper and lower clamping jaws.

As illustrated in FIG. 2, the cable clamp 20 includes an upper jaw 26, an insert 28, and a lower jaw 30. The lower jaw 30 is configured to have a nest 32 which is complementary in shape to the insert 28. Within the nest 32, slide grooves 34 and alignment bosses 36 are disposed to be compatible respectively with slide lips 38 and alignment ears 40 disposed on the insert 28. Therefore, the insert 28 is slidably insertable into the nest 32 and becomes an integral portion of the lower jaw 30 when inserted into the nest 32, as illustrated in FIG. 3. Any suitable interconnecting means may be utilized to forceably converge the jaws 26 and 30 upon the cable 16 in developing the clamping forces. One such means is to extend screws 42 through clearance holes 44 in the upper jaw 26 and secure them into screw receiving openings 46 in the lower jaw 30. The jaws 26 and 30 are interfaced by a parting plane at which the jaws 26 and 30 abut when fully converged.

The insert 28 and both jaws 26 and 30 have contoured surfaces 48 which cooperate to establish a conduit 50 of variable size for passing the cable 16, as illustrated in FIGS. 4 and 5. Raised gripping ribs 52 are disposed on each contoured surface 48. The gripping ribs 52 on the insert 28 and lower jaw 30 are oriented to crisscross relative to the gripping ribs 52 on the upper jaw 26, as illustrated in FIG. 6. Tips 54 extend from each end of the gripping ribs 52 on the upper jaw 26 and the insert 28, with the tips 54 on the upper jaw 26 overlapping the tips 54 on the insert 28 when the jaws 26 and 30 are disposed near their parting plane interface. Except for the insert 28, the lower jaw 30 is fabricated as a continuous portion of the housing 22 and the integral attachment existing therebetween serves as the fastening means for securing the cable clamp 20 to the housing 22.

The housing 22 is generally cylindrical in configuration, as illustrated in FIGS. 2 – 7, and has a compartment 56 configured to receive the contact holder 18 which is secured therein by suitable fastening means such as screws (not shown). The compartment 56 includes a rear bulkhead 58 having a cable entrance 60 through which the cale 16 passes into the compartment 56. The lower jaw 30 is integral to the bulkhead 58 and extends therefrom on the opposite side of the compartment 56.

When the cable clamp is utilized with either the cap 12 or connector body 14 of the cable connector 10, it is assembled thereto by directing one end of the cable 16 through the cable entrance 60 and the compartment 56 of the housing 22 until the housing 22 is disposed well back from the end of the cale 16. The electrical connections are then made between the conductors of the cable 16 and the contact holder 18. thereafter, the cable 16 is directed back through the compartment 56 and cable entrance 60 as by sliding the housing 22 on the cale 16 until the contact holder 18 is properly aligned within the compartment 56. The contact holder 18 is then secured to the housing 22 by the fastening means. The upper jaw 26 is then positioned about the cable 16 and aligned relative to the lower jaw 30. The screws 42 are inserted through the clearance holes 44 in the upper jaw 26 and secured to the screw receiving openings 46 in the lower jaw 30. The cable 16 is clamped between the upper jaw 26 and the lower jaw 30 by tightening the screws 42 evenly to converge the uper jaw 26 upon the lower jaw 30.

Whether the insert 28 is included as an integral part of the lower jaw 30 depends upon the size of the cable 16. When the diameter of the cable 16 falls on the lower side of the diameter range to which the housing 22 is adaptable, the insert 28 is included as part of the lower jaw 30, as illustrated in FIG. 4. When the diameter of the cbale 16 falls on the high side of the diameter range, the insert 28 is not included into the lower jaw 30, as illustrated in FIG. 5. Should the diameter fall within the medium of the diameter range, use of the insert 28 then depends on whether or not the cable 16 would be better centered within the cable entrance 60 of the housing 22.

In a clamped position, the gripping ribs 52 localize the clamping force applied to the cable 16 and are impressed into the jacket of the cable 16, as illustrated in FIG. 7. The impression pattern of the gripping ribs 52 on the cable 16 is illustrated in FIG. 8, where the impression of the upper jaw 26 is shown in solid lines and the impression of the lower jaw 30 is shown in dotted lines. As shown, the impression made by each jaw 26 or 30 is crisscross relative to the other jaw 26 or 30 and therefore, compressive forces are only applied at the intersection of the crisscross. At all other locations, torsional forces are applied which distort the cable 16 about and along its longitudinal axis. This multi-mode distribution of the clamping forces avoids severe distortion of the cable 16 in any one direction and therefore, as illustrated in FIG. 9, the elliptical distortion caused by the compressive forces is relatively minor as compared to prior art devices.

In prior art devices, the opposing griping ribs apply only compressive clamping forces and therefore, an elliptical distortion of much greater magnitude than that shown in FIG. 9 is caused across the table. As elliptical distortion increases, the jacket of the cable accumulates between the interconnecting means of the converging jaws so as to limit the size of the cable clamped or to cause rupture of the cable jacket due to an uneven distribution of clamping forces.

The tips 54 on the gripping ribs 52 provide a greater amount of wrap around on cables 16 of larger diameter and thereby assist in distributing the clamping forces evenly around such cables 16. Because these tips 54 can overlap and extend across the parting plane interface between the jaws 26 and 30, cables 16 of smaller diameter are enfolded by the gripping ribs 52 within a conduit 50, as illustrated in FIG. 4.

The jacket material used on most cables 16 will permanently set due to cold flow when subjected to strain for long periods of time. When the jaws 26 and 30 are rigid or non-resilient, the clamping forces applied to the cable 16 by the cable clamp 20 are sustained only as long as the jacket remains resilient and any permanent set of the jacket will reduce the magnitude of the clamping forces. To compensate for the effect of permanent set in the cable 16, either or both of the jaws 26 and 30 may be fabricated of a flexible and resilient material. When fabricated of such material, the jaws 26 and 30 are then distorted under strain in applying the initial clamping forces to the cable 16. Thereafter, as permanent set develops in the jacket, either or both of the jaws 26 and 30 will strain relieve to apply persisting clamping forces in both compression and torsion to the cable 16.

It should be readily appreciated by those skilled in this art that a cable clamping apparatus embodied by this invention may be utilized to accomplish a multi-mode distribution of clamping forces to cables in a wide range of diameters. Also the clamping forces are distributed more evenly around the cable to avoid ruptures to the jacket of the cable. Furthermore, strain relieving clamping jaws may be utilized to applying persisting multi-mode clamping forces when the jacket of the cable is made of material subject to permanent set.

It should be understood that the present disclosure has been made only by way of example and that numerous changes in details of construction and the combinations or arrangements of parts may be resorted to without departing from the true spirit and scope of the invention and therefore, the present disclosure should be construed as illustrative rather than limiting.

What I claim is:

1. An electrical cable clamp of the type wherein a pair of jaws are joined by interconnecting means for converging said jaws upon the cable to apply clamping forces thereto and wherein each said jaw has a raised gripping rib to localize said clamping forces, the improvement comprising:

said jaws being configured to abut at a parting plane interface, each said jaw including a contoured surface and having said gripping rib disposed on said contoured surface to crisscross relative to said gripping rib on the other said jaw, each said gripping rib having tips extending across said parting plane interface, said gripping ribs cooperating to enfold the cable within a conduit and applying clamping forces thereto in both compression and torsion.

2. The combination of claim 1 wherein a plurality of such gripping ribs are disposed on each said jaw.

3. The combination of claim 1 wherein said interconnecting means comprises a pair of screws extending through clearance holes in one of said jaws and mating into screw receiving openings formed in the other of said jaws.

4. The combination of claim 1 wherein at least one of said jaws is fabricated from flexible and resilient material, said clamping forces resulting in strain to distort said cable clamp, said strain being relieved to apply persisting clamping forces in both compression and torsion as permanent set occurs in the cable.

5. The combination of claim 1 wherein said cable clamp interconnects into an electrical cable connecting device and wherein sid electrical cable connecting device includes fastener means for securing said cable clamp.

6. The combination of claim 5 wherein said electrical cable connecting device includes a housing for containing either a cap or a connector body and wherein one of said jaws is a continuous portion of said housing, said fastener means being the integral attachment existing between said jaw and said housing.

7. The combination of claim 6 wherein said electrical cable connecting device includes a contact holder, said housing having a compartment configured to receive said contact holder and an entrance to pass the cable into said compartment, said contact holder including terminal means for electrically connecting to the conductors of the cable.

8. The combination of claim 1 wherein a plurality of such gripping ribs are disposed on each said jaw and said interconnecting means comprises a pair of screws extending through clearance holes in one of said jaws and mating into screw receiving openings formed in the other of said jaws.

9. The combination of claim 1 wherein said cable clamp is incorporated into an electrical cable connecting device; a plurality of such gripping ribs are disposed on each said jaw; said interconnecting means comprises a pair of screws extending through clearance holes in one of said jaws and mating into screw receiving openings formed in the other of said jaws; and at least one of said jaws is fabricated of flexible and resilient material, said clamping forces resulting in strain to distort said cable clamp, said strain being relieved to apply persisting clamping forces in both compression and torsion when permanent set occurs in the cable, said electrical cable connecting device including a housing and a contact holder, said housing being configured to include one of said jaws as a continuous portion thereof along with a compartment to receive said contact holder and an entrance to pass the cable into said compartment, said contact holder including terminal means for electrically connecting to the conductors of the cable.

* * * * *

UNITED STATES PATENT OFFICE
CERTIFICATE OF CORRECTION

Patent No. 3,784,961　　　　　　　　Dated January 8, 1974

Inventor(x) Albert J. Gartland, Jr.

It is certified that error appears in the above-identified patent and that said Letters Patent are hereby corrected as shown below:

Column 1, line 57 "EAch" should read --Each--.

Column 3, line 34 "cale" should read --cable--.

Column 3, line 43 "cale" should read --cable--.

Column 3, line 48 "cale" should read --cable--.

Column 3, line 58 "uper" should read --upper--.

Column 3, line 66 "cbale" should read --cable--.

Column 4, line 66 "applying" should read --apply--.

Claim 5, line 2 "interconnects" should read --incorporates--.

Claim 5, line 3 "sid" should read --said--.

Signed and sealed this 23rd day of April 1974.

(SEAL)
Attest:

EDWARD M.FLETCHER,JR.
Attesting Officer

C. MARSHALL DANN
Commissioner of Patents